(12) United States Patent
Martin

(10) Patent No.: US 10,926,188 B2
(45) Date of Patent: Feb. 23, 2021

(54) SALT WATER DESALINATION ASSEMBLY

(71) Applicant: Felix Martin, Bakersfield, CA (US)

(72) Inventor: Felix Martin, Bakersfield, CA (US)

( * ) Notice: Subject to any disclaimer, the term of this patent is extended or adjusted under 35 U.S.C. 154(b) by 0 days.

(21) Appl. No.: 16/296,553

(22) Filed: Mar. 8, 2019

(65) Prior Publication Data

US 2020/0282326 A1    Sep. 10, 2020

(51) Int. Cl.
| | | |
|---|---|---|
| *B01D 1/00* | (2006.01) |
| *B01D 5/00* | (2006.01) |
| *B01D 1/30* | (2006.01) |
| *C02F 1/14* | (2006.01) |
| *C02F 103/08* | (2006.01) |

(52) U.S. Cl.
CPC ............ *B01D 1/0035* (2013.01); *B01D 1/30* (2013.01); *B01D 5/006* (2013.01); *C02F 1/14* (2013.01); *C02F 2103/08* (2013.01)

(58) Field of Classification Search
CPC ........ B01D 1/0035; B01D 1/30; B01D 5/006; C02F 1/14
See application file for complete search history.

(56) References Cited

U.S. PATENT DOCUMENTS

| | | | | |
|---|---|---|---|---|
| 2,538,540 A * | 1/1951 | Thurman | ............. | B01D 5/0024 |
| | | | | 202/187 |
| 3,870,605 A * | 3/1975 | Sakamoto | ................. | C02F 1/14 |
| | | | | 202/234 |
| 4,055,473 A * | 10/1977 | Hay | .......................... | B01D 3/00 |
| | | | | 202/234 |
| 4,209,363 A * | 6/1980 | Ramer | ....................... | C02F 1/14 |
| | | | | 202/180 |
| 4,276,122 A | 6/1981 | Snyder | | |
| 5,368,698 A * | 11/1994 | Field | ......................... | B01D 3/42 |
| | | | | 202/160 |
| D425,174 S | 5/2000 | Swancara | | |
| 6,342,127 B1 * | 1/2002 | Possidento | ........... | B01D 5/0066 |
| | | | | 202/234 |
| 6,797,124 B2 | 9/2004 | Ludwig | | |
| 6,966,996 B2 | 11/2005 | Leffler | | |
| 7,771,567 B2 | 8/2010 | Rives | | |
| 8,016,993 B2 | 9/2011 | Hoenig | | |
| 10,093,553 B1 * | 10/2018 | Stefan | ........................ | C02F 1/14 |
| 2003/0150704 A1 * | 8/2003 | Posada | ...................... | B01D 1/04 |
| | | | | 203/1 |
| 2007/0039642 A1 * | 2/2007 | Lasich | ..................... | H02S 99/00 |
| | | | | 136/243 |
| 2008/0073198 A1 * | 3/2008 | Simon | ....................... | C02F 1/14 |
| | | | | 202/81 |

(Continued)

*Primary Examiner* — Jonathan Miller

(57) ABSTRACT

A salt water desalination assembly includes a tank for containing salt water. The tank has an inverted cone therein that is positioned above the salt water thereby facilitating water vapor from the salt water to condense on the inverted cone. An input pipe extends into the tank to fill the tank with the salt water. A condensate pipe extends upwardly into the tank and the condensate pipe is aligned with the inverted cone to collect the condensed water vapor for subsequent use. A stand is vertically oriented and is positioned adjacent to the tank. A reflector is pivotally coupled to the stand and the reflector is exposed to sunlight. The reflector focuses the reflected sunlight onto the tank for heating the tank and thereby facilitate the salt water in the tank to be heated for producing the water vapor.

8 Claims, 4 Drawing Sheets

(56) References Cited

U.S. PATENT DOCUMENTS

| | | | |
|---|---|---|---|
| 2008/0164135 A1* | 7/2008 | Slook | B01D 1/0035 202/83 |
| 2016/0368784 A1 | 12/2016 | Haynes | |
| 2018/0119392 A1* | 5/2018 | Kohl | E03B 3/28 |

* cited by examiner

SALT WATER DESALINATION ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to desalination devices and more particularly pertains to a new desalination device for desalinating salt water with solar energy.

BRIEF SUMMARY OF THE INVENTION

An embodiment of the disclosure meets the needs presented above by generally comprising a tank for containing salt water. The tank has an inverted cone therein that is positioned above the salt water thereby facilitating water vapor from the salt water to condense on the inverted cone. An input pipe extends into the tank to fill the tank with the salt water. A condensate pipe extends upwardly into the tank and the condensate pipe is aligned with the inverted cone to collect the condensed water vapor for subsequent use. A stand is vertically oriented and is positioned adjacent to the tank. A reflector is pivotally coupled to the stand and the reflector is exposed to sunlight. The reflector focuses the reflected sunlight onto the tank for heating the tank and thereby facilitate the salt water in the tank to be heated for producing the water vapor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
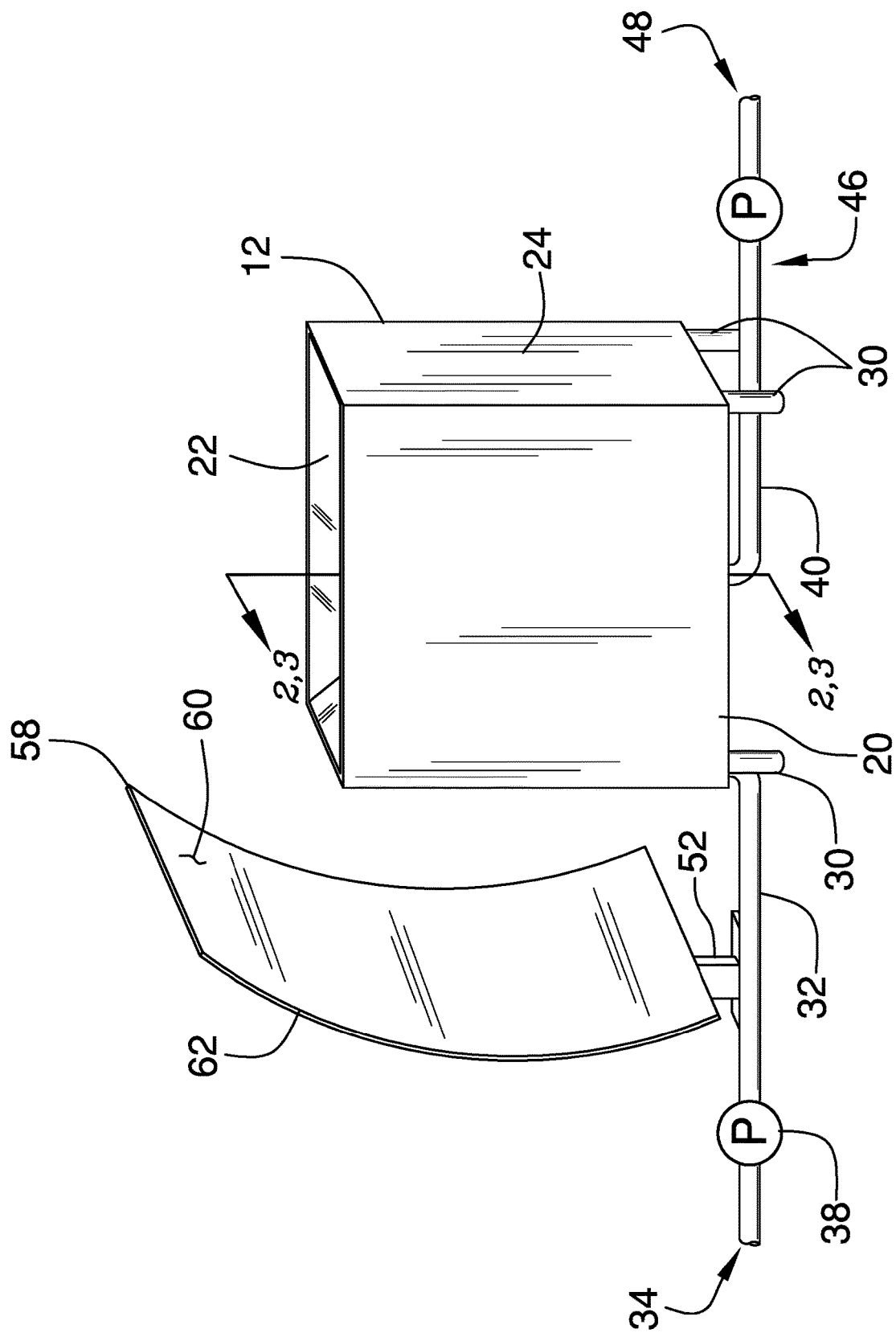
FIG. 1 is a right side perspective view of a salt water desalination assembly according to an embodiment of the disclosure.
Figure 2:
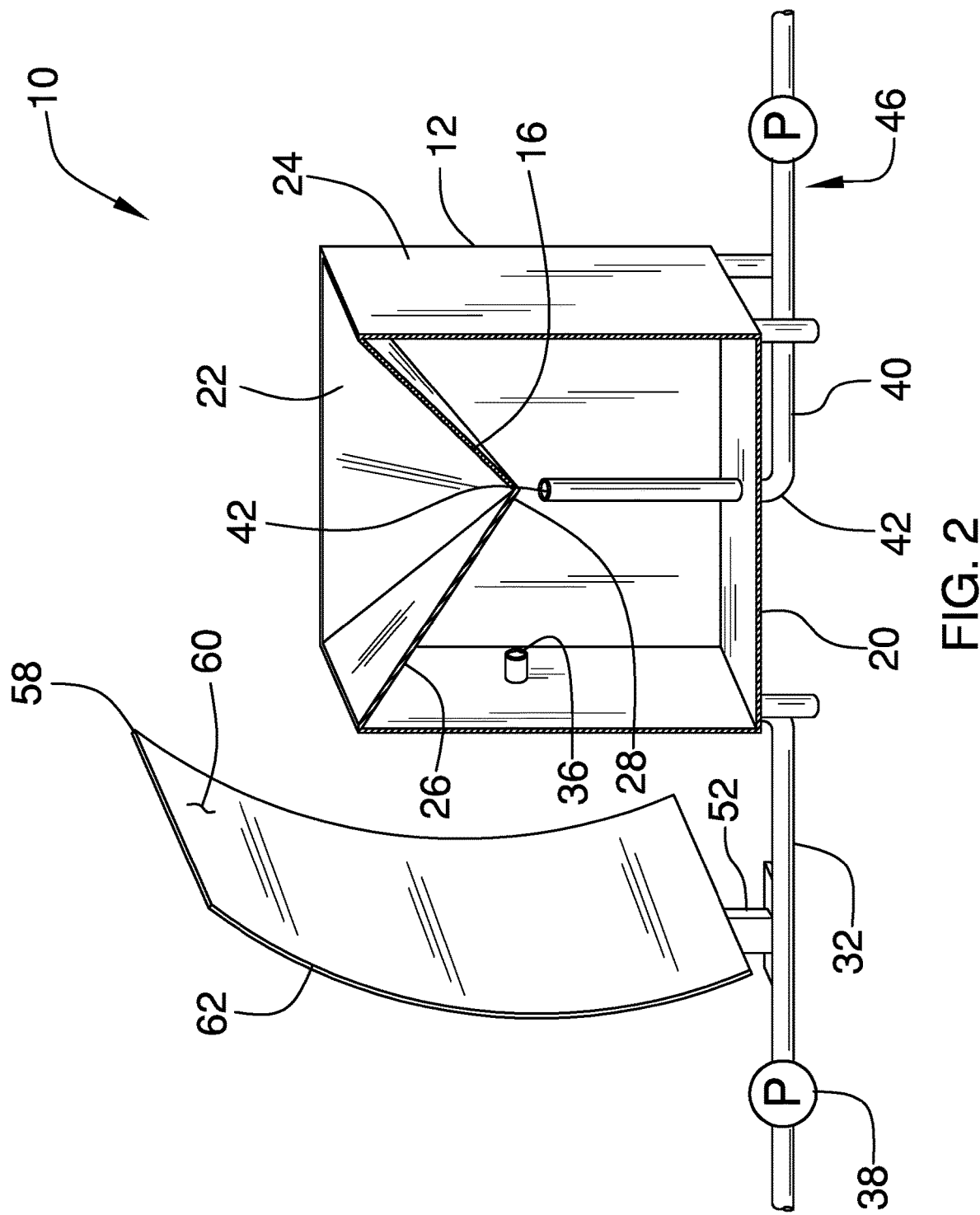
FIG. 2 is a cross sectional view taken along line 2-2 of FIG. 1 of an embodiment of the disclosure.
Figure 3:
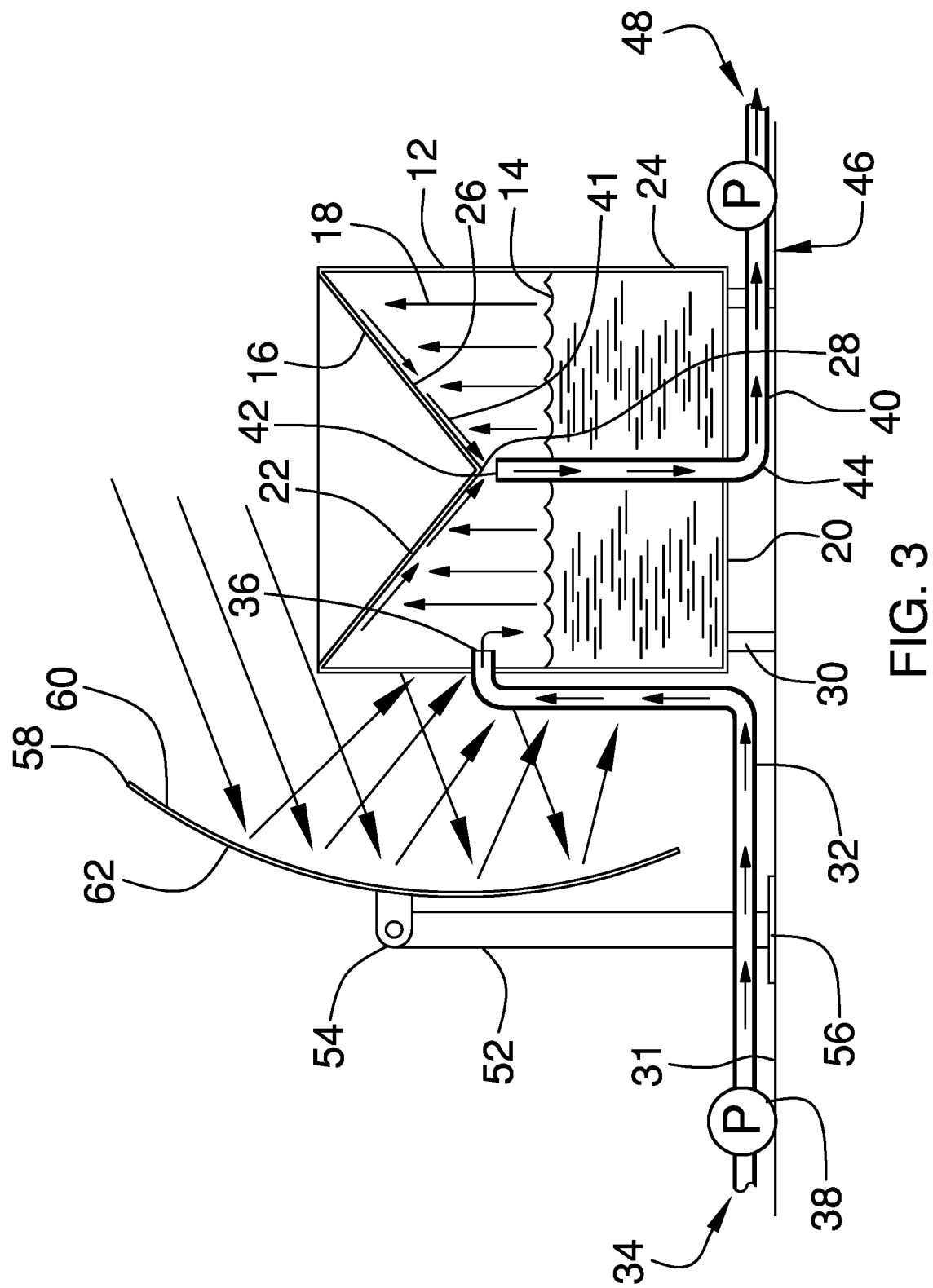
FIG. 3 is a cross sectional view taken along line 3-3 of FIG. 1 of an embodiment of the disclosure showing salt water in a tank being vaporized by solar energy.

With reference now to the drawings, and in particular to FIGS. 1 through 4 thereof, a new desalination device embodying the principles and concepts of an embodiment of the disclosure and generally designated by the reference numeral 10 will be described.

As best illustrated in FIGS. 1 through 4, the salt water desalination assembly 10 generally comprises a tank 12 for containing salt water 14. The tank 12 has an inverted cone 16 therein that is positioned above the salt water 14. Thus, water vapor 18 from the salt water 14 can condense on the inverted cone 16. The tank 12 is comprised of a thermally conductive material such that the tank 12 is in thermal communication with the salt water 14.

The tank 12 has a bottom wall 20, a top wall 22 and an outer wall 24 extending therebetween. The top wall 22 slopes downwardly from the outer wall 24 toward a center point of the tank 12 such that the top wall 22 defines the inverted cone 16. The inverted cone 16 has a lower facing surface 26 that faces an interior of the tank 12. Thus, the lower facing surface 26 facilitates the water vapor 18 to condense thereupon and subsequently run downwardly along the lower facing surface 26 toward a point 28 of the inverted cone 16. A plurality of legs 30 is each of the legs 30 is coupled to and extends downwardly from the tank 12. Each of the legs 30 spaces the tank 12 from a support surface 31 thereby inhibiting thermal communication between the tank 12 and the support surface 31. Additionally, each of the legs 30 is positioned on the bottom wall 20 of the tank 12.

An input pipe 32 extends into the tank 12 and the input pipe 32 is fluidly coupled to a salt water source 34 to fill the tank 12 with the salt water 14. The salt water source 34 may be an ocean or other natural source of salt water 14. The input pipe 32 has a first end 36 extending through the outer wall 24 of the tank 12 at a point 28 is closer to the top wall 22 than the bottom wall 20. The input pipe 32 is comprised of a thermally conductive material to be in thermal communication with the salt water 14. An input pump 38 is fluidly coupled to the input pipe 32 and the input pump 38 is electrically coupled to a power source. The input pump 38 pumps the salt water 14 through the input pipe 32 when the input pump 38 is turned on to fill the tank 12 with the salt water 14. The input pump 38 may be an electric fluid pump of any conventional design.

A condensate pipe 40 extends upwardly into the tank 12 and the condensate pipe 40 is aligned with the inverted cone 16. Thus, the condensate pipe 40 collects the condensed water vapor 41 dripping from the inverted cone 16 for subsequent use. The condensate pipe 40 extends upwardly through the bottom wall 20 of the tank 12 and the condensate pipe 40 has a distal end 42 with respect to the bottom wall 20. Moreover, the distal end 42 is aligned with and is positioned below the point 28 of the inverted cone 16. In this way the condensed water vapor 41 drips into the distal end 42 of the condensate pipe 40.

The condensate pipe 40 has a bend 44 thereon that is positioned below the bottom wall 20 of the tank 12 to define an output portion 46 of the condensate pipe 40 extending away from the tank 12. The output portion 46 is fluidly coupled to a freshwater storage 48 for storing the condensed water vapor 41. The freshwater storage 48 may be a potable water tank or the like. An output pump 50 is fluidly coupled to the condensate pipe 40 and the output pump 50 is electrically coupled to a power source. The output pump 50 is positioned on the output portion 46 of the condensate pipe 40 for pumping the condensed water vapor 41 through the output portion 46 into the freshwater storage 48. The output pump 50 may be an electric fluid pump of any conventional design.

A stand 52 is provided and the stand 52 is vertically oriented and is positioned adjacent to the tank 12. The stand 52 has a top end 54 and a bottom end 56, and the bottom end 56 abuts the support surface 31 having the top end 54 being spaced from the support surface 31. A reflector 58 is provided and the reflector 58 is pivotally coupled to the stand 52 such that the reflector 58 is exposed to sunlight. The reflector 58 is pointed toward the tank 12 and the reflector 58 is curved into a parabola such that the reflector 58 focuses the reflected sunlight onto the tank 12. In this way the tank 12 is heated by the sunlight thereby facilitating the salt water 14 in the tank 12 to be heated for producing the water vapor 18.

Figure 4:
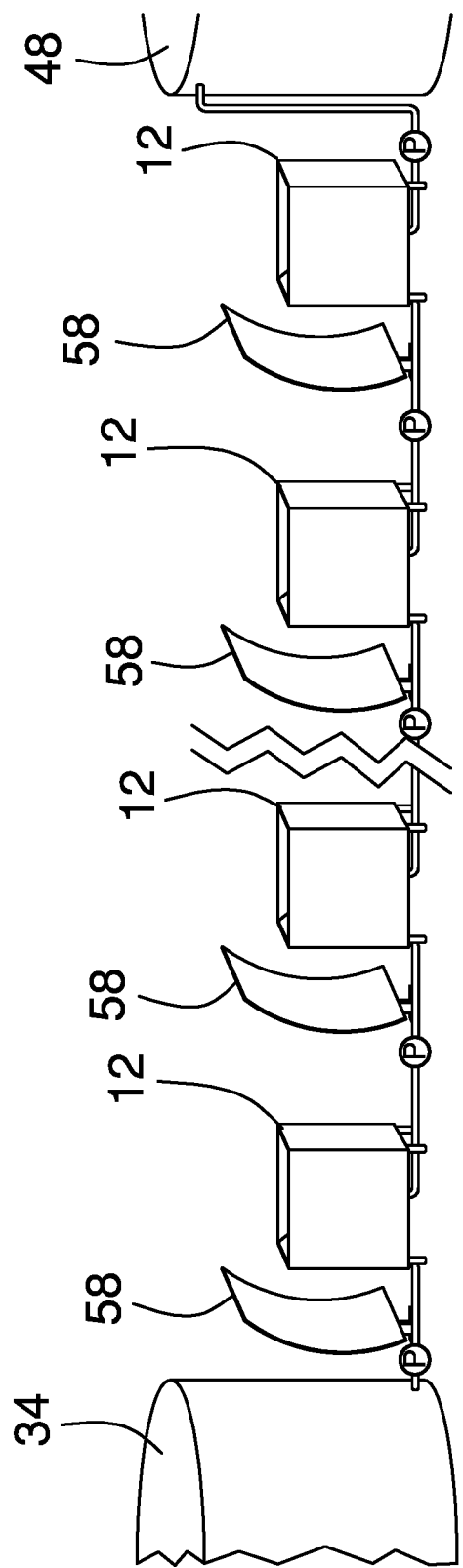
FIG. 4 is a perspective in-use view of an embodiment of the disclosure showing a plurality of the assemblies being daisy chained together.

The reflector 58 has a front surface 60 and a back surface 62. The front surface 60 is curved into the parabola and the front surface 60 comprises a light reflecting surface. Additionally, the back surface 62 is pivotally coupled to the top end 54 of the stand 52 having the front surface 60 being directed toward the outer wall 24 of the tank 12. Additionally, the input pipe 32 is exposed to the reflected sunlight for heating the salt water 14 as it passes through the input pipe 32. The reflector 58 has a height that is greater than a height of the tank 12 such that the reflector 58 extends upwardly beyond the top wall 22 of the tank 12. As shown in FIG. 4, a plurality of the tanks 12 and reflectors 58 can be daisy chained together for increasing the hourly output of freshwater.

In use, the input pump 38 is turned on to fill the tank 12 with the salt water 14. The reflector 58 is positioned at a selected angle on the stand 52 to focus the reflected sunlight onto the outer wall 24 of the tank 12. Thus, the salt water 14 in the tank 12 is heated for producing the water vapor 18. The water vapor 18 subsequently rises and condenses on the lower facing surface 26 of the inverted cone 16. Additionally, the condensed water vapor 41 runs downwardly along the lower facing surface 26 of the cone until the condensed water vapor 41 drips from the point 28 of the inverted cone 16. Thus, the condensed water falls into the distal end 42 of the condensate pipe 40 for collection in the freshwater storage. In this way fresh water can be condensed from salt water 14 by using solar energy.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A salt water desalination assembly being configured to desalinate salt water with sun driven condensation, said assembly comprising:
   a tank for containing salt water, said tank having an inverted cone therein wherein said inverted cone is configured to be positioned above the salt water thereby facilitating water vapor from the salt water to condense on said inverted cone, said inverted cone being an inverted rectangular pyramid shape having four planar triangular faces, said tank being comprised of a thermally conductive material wherein said tank is configured to be in thermal communication with the salt water, said tank has a bottom wall, a top wall and an outer wall extending thererbetween, said top wall sloping downwardly from said outer wall toward a center point of said tank such that said top wall defines said inverted cone, said inverted cone having a lower facing surface that faces an interior of said tank wherein said lower facing surface is configured to have the water vapor condense thereupon thereby facilitating the condensed water vapor to run downwardly along said lower facing surface toward a point of said inverted cone;
   an input pipe extending into said tank, said input pipe being fluidly coupled to a salt water source wherein said input pipe is configured to fill said tank with the salt water;
   a condensate pipe, said condensate pipe having a vertical section extending upwardly into said tank, said condensate pipe having a constant diameter extending a full length of said vertical section, an upper edge of said vertical section being horizontally spaced below and aligned with said inverted cone wherein said condensate pipe is configured to collect the condensed water vapor dripping from said inverted cone for subsequent use;
   a stand being vertically oriented and being positioned adjacent to said tank; and
   a reflector being pivotally coupled to said stand wherein said reflector is configured to be exposed to sunlight, said reflector being pointed toward said tank, said reflector being curved into a parabola such that said reflector focuses the reflected sunlight onto said tank wherein said tank is configured to be heated by the sunlight thereby facilitating the salt water in said tank to be heated for producing the water vapor.

2. The assembly according to claim 1, further comprising a plurality of legs, each of said legs being coupled to and extending downwardly from said tank, each of said legs spacing said tank from a support surface thereby inhibiting thermal communication between said tank and the support surface, each of said legs being positioned on said bottom wall of said tank.

3. The assembly according to claim 1, wherein said input pipe has a first end extending through said outer wall of said tank at a point being closer to said top wall than said bottom wall, said input pipe being comprised of a thermally conductive material wherein said input pipe is configured to be in thermal communication with the salt water.

4. The assembly according to claim 3, further comprising an input pump being fluidly coupled to said input pipe, said input pump being electrically coupled to a power source, said input pump pumping the salt water through said input pipe when said input pump is turned on wherein said input pipe is configured to fill said tank with the salt water.

5. The assembly according to claim 1, wherein:
said condensate pipe extends upwardly through said bottom wall of said tank, said condensate pipe having a distal end with respect to said bottom wall, said distal end being aligned with and being positioned below said point of said inverted cone; and
said condensate pipe has a bend thereon being positioned below said bottom wall of said tank to define an output portion of said condensate pipe that extends away from said tank, said output portion being configured to be fluidly coupled to a freshwater storage for storing the condensed water vapor.

6. The assembly according to claim 5, further comprising an output pump being fluidly coupled to said condensate pipe, said output pump being electrically coupled to a power source, said output pump being positioned on said output portion of said condensate pipe, said output pump pumping the condensed water vapor through said output portion into the freshwater storage.

7. The assembly according to claim 2, wherein:
said stand has a top end and a bottom end, said bottom end abutting the support surface having said top end being spaced from the support surface; and
said reflector has a front surface and a back surface, said front surface being curved into said parabola, said back surface being pivotally coupled to said top end of said stand having said front surface being directed toward said outer wall of said tank.

8. A salt water desalination assembly being configured to desalinate salt water with sun driven condensation, said assembly comprising:
a tank for containing salt water, said tank having an inverted cone therein wherein said inverted cone is configured to be positioned above the salt water thereby facilitating water vapor from the salt water to condense on said inverted cone, said inverted cone being an inverted rectangular pyramid shape having four planar triangular faces, said tank being comprised of a thermally conductive material wherein said tank is configured to be in thermal communication with the salt water, said tank having a bottom wall, a top wall and an outer wall extending thererbetween, said top wall sloping downwardly from said outer wall toward a center point of said tank such that said top wall defines said inverted cone, said inverted cone having a lower facing surface that faces an interior of said tank wherein said lower facing surface is configured to have the water vapor condense thereupon thereby facilitating the condensed water vapor to run downwardly along said lower facing surface toward a point of said inverted cone;
a plurality of legs, each of said legs being coupled to and extending downwardly from said tank, each of said legs spacing said tank from a support surface thereby inhibiting thermal communication between said tank and the support surface, each of said legs being positioned on said bottom wall of said tank;
an input pipe extending into said tank, said input pipe being fluidly coupled to a salt water source wherein said input pipe is configured to fill said tank with the salt water, said input pipe having a first end extending through said outer wall of said tank at a point being closer to said top wall than said bottom wall, said input pipe being comprised of a thermally conductive material wherein said input pipe is configured to be in thermal communication with the salt water;
an input pump being fluidly coupled to said input pipe, said input pump being electrically coupled to a power source, said input pump pumping the salt water through said input pipe when said input pump is turned on wherein said input pipe is configured to fill said tank with the salt water;
a condensate pipe, said condensate pipe having a vertical section extending upwardly into said tank, said condensate pipe having a constant diameter extending a full length of said vertical section, an upper edge of said vertical section being horizontally spaced below and aligned with said inverted cone wherein said condensate pipe is configured to collect the condensed water vapor dripping from said inverted cone for subsequent use, said condensate pipe extending upwardly through said bottom wall of said tank, said condensate pipe having a distal end with respect to said bottom wall, said distal end being aligned with and being positioned below said point of said inverted cone, said condensate pipe having a bend thereon being positioned below said bottom wall of said tank to define an output portion of said condensate pipe that extends away from said tank, said output portion being configured to be fluidly coupled to a freshwater storage for storing the condensed water vapor;
an output pump being fluidly coupled to said condensate pipe, said output pump being electrically coupled to a power source, said output pump being positioned on said output portion of said condensate pipe, said output pump pumping the condensed water vapor through said output portion into the freshwater storage;
a stand being vertically oriented and being positioned adjacent to said tank, said stand having a top end and a bottom end, said bottom end abutting the support surface having said top end being spaced from the support surface; and
a reflector being pivotally coupled to said stand wherein said reflector is configured to be exposed to sunlight, said reflector being pointed toward said tank, said reflector being curved into a parabola such that said reflector focuses the reflected sunlight onto said tank wherein said tank is configured to be heated by the sunlight thereby facilitating the salt water in said tank to be heated for producing the water vapor, said reflector having a front surface and a back surface, said front surface being curved into said parabola, said back surface being pivotally coupled to said top end of said stand having said front surface being directed toward said outer wall of said tank.

\* \* \* \* \*